United States Patent [19]

Sueshige

[11] Patent Number: 5,279,101
[45] Date of Patent: Jan. 18, 1994

[54] CONTROL LEVER ASSEMBLY FOR SELF-PROPELLED MACHINERY

[75] Inventor: Hiroshi Sueshige, Tsurugashima, Japan

[73] Assignee: Honda Giken Kogyo Kabushiki Kaisha, Tokyo, Japan

[21] Appl. No.: 904,270

[22] Filed: Jun. 25, 1992

[51] Int. Cl.5 .................... A01D 69/08; A01D 75/20
[52] U.S. Cl. ...................................... 56/11.5; 56/11.8
[58] Field of Search .................. 56/10.8, 11.3, 11.4, 56/11.5, 11.8

[56] References Cited

U.S. PATENT DOCUMENTS

| 4,309,861 | 1/1982 | Carlson | 56/11.3 X |
|---|---|---|---|
| 4,335,566 | 6/1982 | Hurd | 56/11.8 |
| 4,367,813 | 1/1983 | Wieland et al. | 56/11.3 X |
| 4,433,530 | 2/1984 | Schaefer | 56/10.8 X |
| 4,493,180 | 1/1985 | Wick | 56/11.3 |
| 4,538,401 | 9/1985 | Takamizawa et al. | 56/11.8 |
| 4,573,307 | 3/1986 | Wick | 56/11.8 |
| 4,747,256 | 5/1988 | Sadakane | 56/10.8 X |
| 4,932,192 | 6/1990 | Ishimaru | 56/10.8 X |

FOREIGN PATENT DOCUMENTS 60-37022 2/1985 Japan.

Primary Examiner—George A. Suchfield
Attorney, Agent, or Firm—Birch, Stewart, Kolasch & Birch

[57] ABSTRACT

A lever assembly including a clutch actuator mechanism is located within a housing on a handle assembly of a self-propelled machine for selectively activating and deactivating respective clutches for applying power from a prime mover, such as a gasoline engine, to at least one of a set of drive wheels for propelling the machine over a work surface and for applying power to one or more cutting elements, which may be, for example, a blade of a self-propelled lawn mower. Depending upon the sequence of actuation of two clutch activating control levers, the self-propelling drive wheels, cutter element, or both can be selectively actuated so that an operator may, for example, cause the lawn mower to travel across a surface without power being applied to the cutting blade.

25 Claims, 5 Drawing Sheets

CONTROL LEVER ASSEMBLY FOR SELF-PROPELLED MACHINERY

BACKGROUND OF THE INVENTION

1. Field of the Invention

The present invention relates generally to manually operated control apparatus for self-propelled machinery which includes lawn mowers, tillers, snow blowers and the like, and more particularly to a control lever assembly therefor having first and second manually operated controls for controlling respective clutches in order to apply power to a set of self-propelling drive wheels and for controlling the power applied to an implement such as a lawn mower blade.

2. Description of the Prior Art

Self-propelled machines followed by and controlled by an operator are generally well known and take many forms including, among other things, lawn mowers, snow blowers, tillers, floor scrappers and sanders, and masonry saws used in connection with roadway construction.

Such equipment typically includes at least one control lever for engaging a set of drive wheels which thereupon act to propel the machinery across a work surface. Additionally, it is also well known to include a second control lever for activating an implement such as a cutting blade.

More recently the two control levers have become interrelated, a typical example being the arrangement shown and described in U.S. Pat. No. 4,538,401, entitled, "Control Lever Assembly In A Self-Propelled Lawn Mower", which issued to M. Takamizawa et al on Sep. 3, 1985 and which is assigned to the assignee of this invention. In U.S. Pat. No. 4,538,401, a control lever assembly is described for a self-propelled lawn mower which includes a first control lever for selectively connecting and disconnecting a first clutch for applying power from a prime mover to a set of propelling wheels and a second control lever for selectively connecting and disconnecting a second clutch between the prime mover and a grass cutting blade. The two control levers, moreover, are interconnected so that power can be selectively applied to either the wheels, the cutting blade, or both, as required.

It is to this latter type of apparatus that the present invention is directed.

SUMMARY OF THE INVENTION

Accordingly, it is a primary object of the present invention to provide an improved control assembly for selectively activating and deactivating a wheel drive and cutting implement in a self-propelled piece of machinery including, inter alia, lawn mowers and the like.

It is yet a further object of the invention to provide an improved control lever assembly in a self-propelled machine including a cutting element which is capable of being self-propelled while keeping the cutting element deactivated.

It is another object of the invention to provide a control lever assembly which permits simple and easy switching of operating modes between a pair of clutch assemblies which respectively operate to apply power to a set of drive wheels and a cutting blade or rotor.

It is yet a further object of the invention to provide an improved lever control assembly for activating a pair of control levers which control the operation of a pair of clutches for selectively applying power to the wheels and/or cutter element located on a self-propelled lawn mower or similar apparatus.

Briefly, the foregoing and other objects are achieved by an improved lever assembly located within a housing located on a handle assembly for selectively activating and deactivating respective clutches for applying power from a prime mover, such as a gasoline engine, to at least one of a set of drive wheels for propelling a carriage over a work surface and for applying power to one or more cutting elements, which may be, for example, a blade or a rotor of, but not limited to, a self-propelled lawn mower.

A pair of manually actuable crossbars respectively coupled to an interconnected wheel drive control lever and a blade control lever assembly operate to activate a pair of clutch cables. The wheel drive control lever is pivotally connected to a drive clutch rod and one end of a drive clutch cable. The drive clutch rod includes a slotted end which engages the pin of a spring biased hook type element mounted on the blade control lever and having a hook at one end which is engageable with a pin located on a rotatable eccentric blade clutch cable activating plate. Both the blade control lever and the eccentric plate are pivotally mounted on an upwardly projecting flat post member. A blade clutch cable is connected to an outer body portion of the eccentric plate away from the plate's pivot. Depending upon the sequence of actuation of the two control levers via their respective crossbar members, the self-propelling drive wheels, cutter element, or both can be selectively actuated so that an operator may, for example, cause the lawn mower to travel across a surface without the cutting element being activated.

BRIEF DESCRIPTION OF THE DRAWINGS

The subject invention will be more readily understood when considered in conjunction with the accompanying drawings wherein.

DETAILED DESCRIPTION OF THE INVENTION

While the following detailed description of the invention will be made with respect to a self-propelled lawn mower, the invention is not meant to be limited to this type of apparatus, but may be applicable to other types of machinery as well. Typical examples of other machinery to which the present invention can be utilized with includes such apparatus as snow blowers, rotor tillers, floor scrappers and sanders, power saws utilized in cutting cement and asphalt roadways and walks, and even self-propelled traffic lane line painters.

Figure 1:
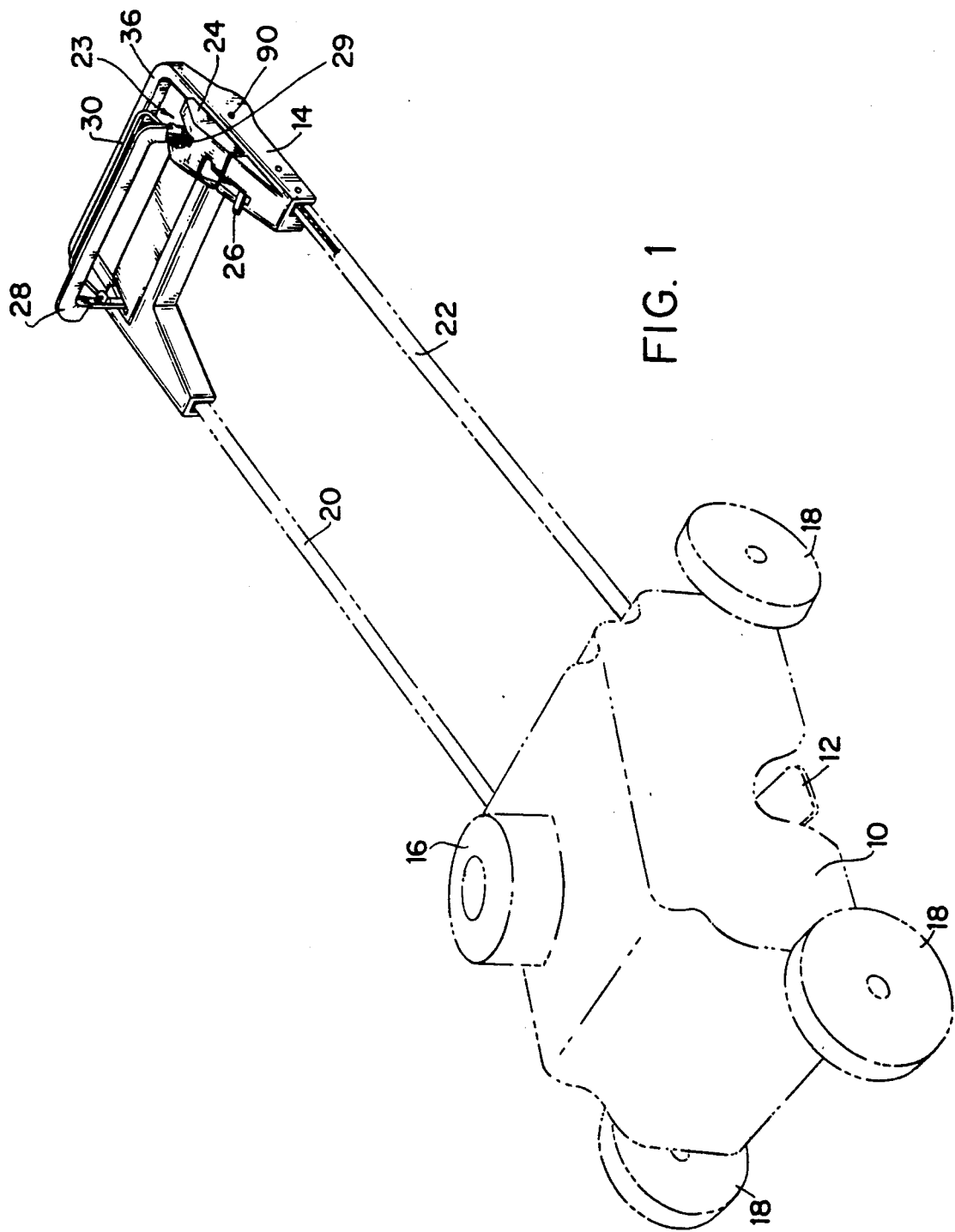
FIG. 1 is a perspective view partly in phantom of a self-propelled machine such as a lawn mower and having a control lever housing thereon including the preferred embodiment of the invention located thereon.
Figure 8:
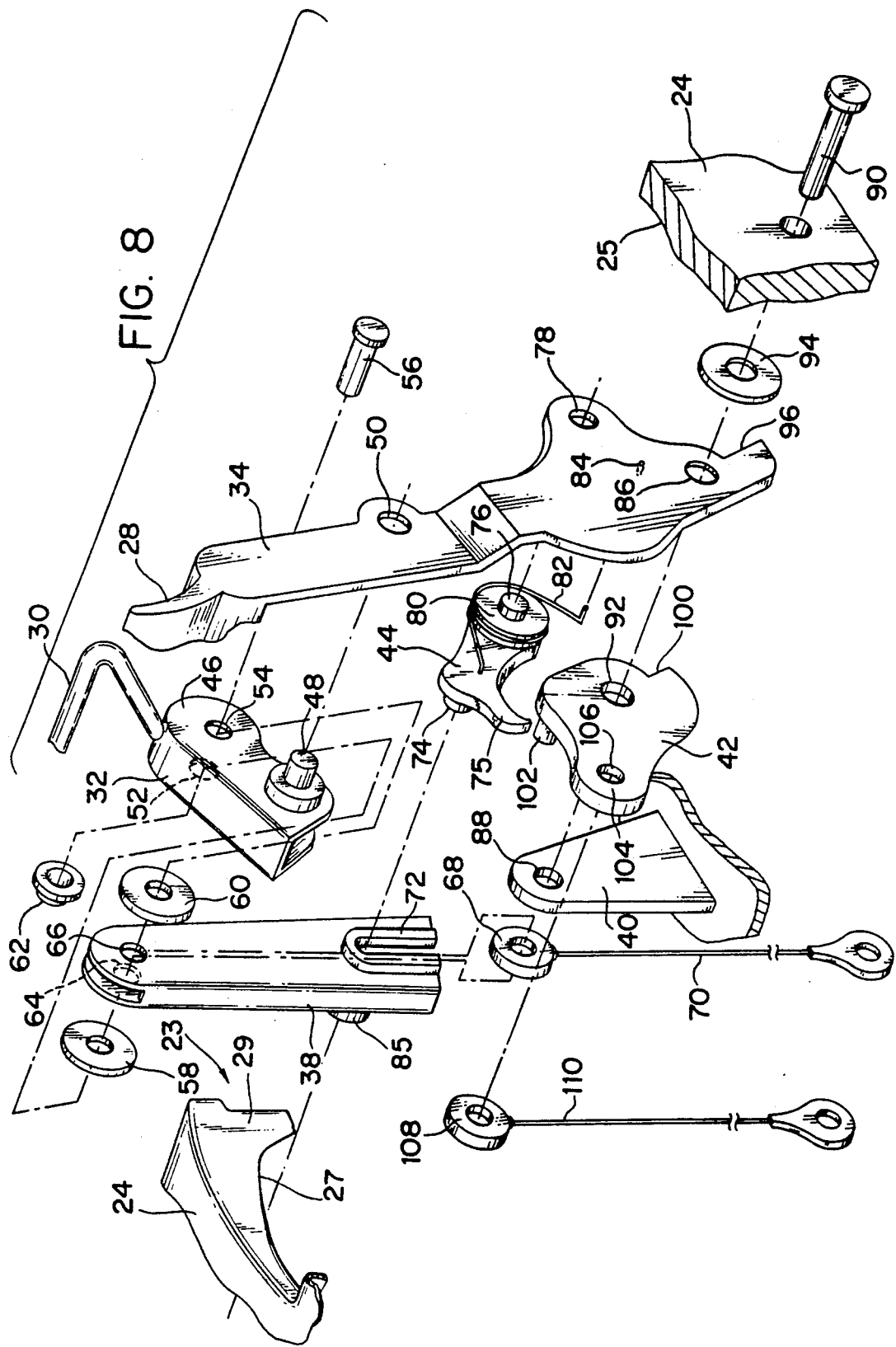
FIG. 8 is an exploded perspective view of the mechanical parts included in the preferred embodiment of the invention.

Referring now to FIG. 1, shown thereat is a wheeled carriage 10 including a cutting element 12, which may be, for example, a horizontally rotating cutting blade. Also included in or carried by the carriage 10 are one or more clutch assemblies, not shown, which are selectively activated from a handle assembly 14 to supply power from a prime mover 16, e.g. a gasoline engine, to the cutting blade 12 and/or at least one of a plurality of carriage propelling drive wheels 18. The handle assembly 14 is attached to the outer end of a carriage mounted pair of elongated support rods 20 and 22. The assembly 14 includes, among other things, a control lever housing 24 containing a control lever arrangement, the details of which are shown in FIG. 8, as well as an engine throttle lever 26. The control lever housing 24 is shown, for purposes of illustration, located on an upper inner left hand side portion of the handle assembly 14 and includes a slot 25 directed rearwardly to accommodate the raising and lowering of a pair of pivotable crossbar members 28 and 30 which are respectively joined to the outer ends of a wheel drive lever member 32 and a blade control lever member 34 (FIG. 8). A crossbar member 36, which faces the operator, is included in the handle assembly 14 to act as a protective device for the crossbars 28 and 30 when they are lowered.

Prior to describing the three operating modes provided by the subject invention, the implementation of the lever control mechanism as shown in FIG. 8 will be first considered. The principal elements of this mechanism include, in addition to the drive control lever 32 and the blade control lever 34, an elongated hollow clutch rod member 38, a control lever mounting post 40, an off-centered or eccentric cable actuating plate 42, and a spring biased hook type member 44 which operates in conjunction with the eccentric plate 42 as will become evident as this detailed description proceeds.

Considering each of these elements now in greater detail, the self-propelling wheel drive lever member 32, for example, comprises an open three walled structure having a pair of parallel side walls and a top cross wall, with a side wall 46 having a pivot 48 located at the inner end thereof. The pivot 48 fits into a circular mounting hole 50 in the upper intermediate region of the blade control lever 34 and permits the wheel drive lever 32 to be rotated up and down about the pivot 48 by manual activation of the crossbar 30. The outer end of the wheel drive lever 32, moreover, is adapted to receive therein one end portion of the hollow clutch rod 38 which is pivotally attached thereto via a pair of throughholes 52 and 54, a pivot bolt 56, a pair of annular spacers 58 and 60, and a cap nut 62. Also as shown in FIG. 8, the pivot bolt 56 not only passes through a pair of throughholes 64 and 66 in the outer or distal end of the clutch rod 38, but also the end ring member 68 of a wheel drive clutch cable 70 which passes up through the length of the hollow clutch rod 38.

The inner or proximal end of the clutch rod member 38 includes a U-shaped slotted end portion 72 which is operable to engage an outwardly extending pin 74 located on the hook member 44 and operates to rotate the member 44 about a pivot 76. The pivot 76 fits into a circular mounting hole 78 on a lower intermediate region of the blade control lever 34. Surrounding the pivot 76 is a raised circular region 80 which supports a bias spring 82 which is secured at one end to the body of the member 44 while the other end is attached to the blade control lever 34 at 84. The clutch rod member 38 also includes a guide pin 85 opposite the slotted end portion 72 which operates as a cam follower and contacts a cam surface comprising a curved edge 27 of an inner face 29 of the control lever housing 24 adjacent the slot 23 (FIG. 1) and operates as a cam surface to guide the motion of the crossbar 30 coupled to the clutch rod 38 via the wheel drive lever 32, as will be explained hereinafter.

Figure 2:
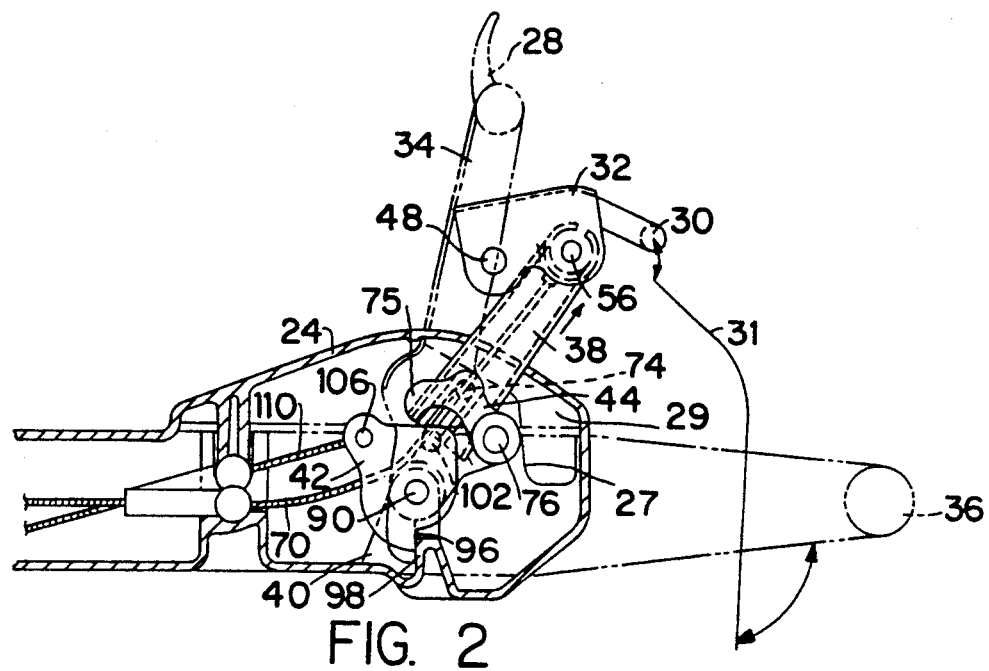
FIGS. 2-7 are partial central longitudinal sections of the control lever housing shown in FIG. 1 and being illustrative of the operation of the subject invention.
Figure 7:
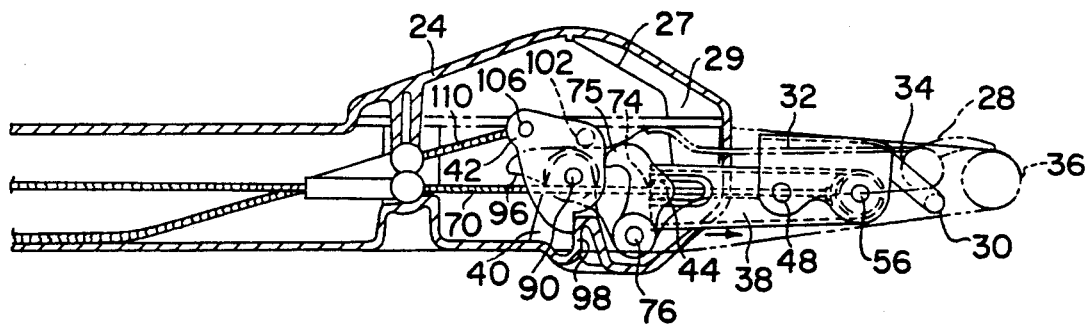

The blade control lever 34 comprises an elongated member having a mounting hole 86 at the bottom for being pivotally attached to the flat mounting post 40 which includes a mounting hole 88 and which is adapted to accept a bolt 90 which defines a pivotal axis for both the eccentric plate 42 and the lever 34 by passing not only through the hole 86 of the blade control lever, but also through an off center mounting hole 92 in the eccentric plate 42. An annular spacer 94 is shown located between the blade control lever 34 and the inner side wall 25 of the control lever housing 24 (FIG. 1). The blade control lever 34, moreover, includes a lower shoulder stop 96 which is adapted to abut a stop 98 formed in the lower portion of the control lever housing 24 as shown in FIGS. 2 and 7 when rotated upward or counter-clockwise (CCW).

With reference to the eccentric plate 42, it also includes a lower shoulder stop 100 which is adapted to hit the stop 98 when it rotates counter-clockwise (CCW). A pin or stud 102 is located on the upper portion of the plate 42 and is adapted to be engaged and rotated rearwardly or clockwise (CW) by the hook portion 75 of the member 44 when actuated by the drive clutch rod 38. The plate member 42 also includes a forward outer body portion 104 which includes a mounting hole 106 across from the mounting hole 92. The inner end ring member 108 of a blade clutch cable 110 is attached to the plate 42 at this point.

Considering now the operation of the configuration shown in FIG. 8, its purpose is to selectively activate and deactivate the drive clutch cable 70 and the blade clutch cable 110 when the drive control lever 32 and the blade control lever 34 are manually operated by the respective crossbar members 30 and 28.

Referring now to FIGS. 2-7, three modes of operation are depicted, namely: drive wheel only mode, a cutting blade only mode, and a simultaneous blade and wheel drive mode.

FIG. 2 is illustrative of a neutral position wherein both the crossbars 28 and 30 are lifted or manually rotated counter-clockwise (CCW). This causes the wheel drive lever 32 pivotally connected to the blade drive lever 34 to rotate about the pivot 48 along with the lever 34 which in turn has rotated about the pivot 90 until the shoulder stop 96 abuts the housing stop 98. The counter-clockwise rotation of the blade lever 34 also causes the eccentric plate 42 to rotate counter-clockwise due to the fact that the pin 102 is still in engagement with the hook portion 75 of the member 44. This operates to slacken the blade clutch cable 110 and so deactivates the cutting blade 12 (FIG. 1). When the wheel drive lever 32 is pulled up and rotated counter-clockwise (CCW) as shown in FIG. 2, it operates to draw the clutch rod 38 upwardly and outwardly. This causes the drive clutch cable 70 to slacken or lose tension. At the same time, the slot 72 (FIG. 8) in the clutch rod 38 releases the pressure on the pin 74 of the hook type member 44 which rotates backwards clockwise about the pivot at 76 due to the action of the bias spring 82. Thus in the raised position of the two drive levers 32 and 34, both clutch cables 70 and 110 deactivate the resistive clutches, not shown, to which they are attached and thus no power is applied from the prime mover 16 to the blade 12 or wheels 18.

Figure 3:
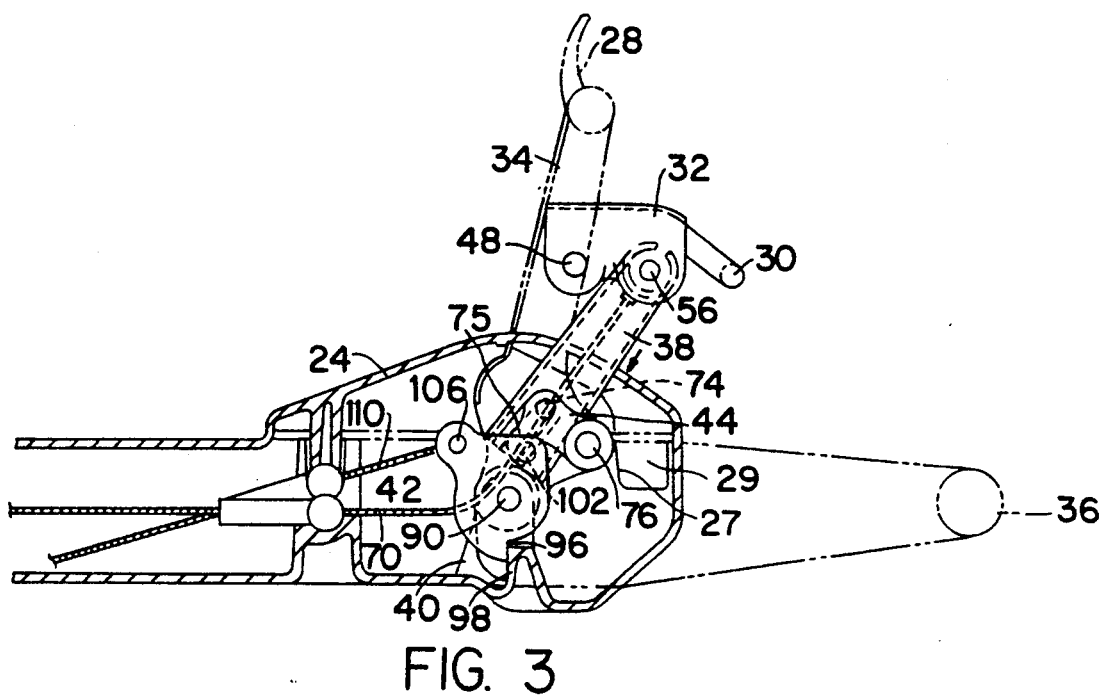

In the event that one subsequently wishes to activate the cutting blade 12 only, i.e. without power being applied to the drive wheels 18, the initial step is shown in FIG. 3 and consists in first manually pushing the wheel drive crossbar 30 downward or clockwise, while the blade lever 34 is raised. This causes the clutch rod 38 to move inward, whereupon the U-shaped slot 72, shown in FIG. 8, engages the pin 74 of the hook type member 44, rotating it counter-clockwise (CCW) about the pivot 76, causing the hook portion 75 of the member 44 to once again engage the pin 102 of the eccentric plate 42.

Figure 4:
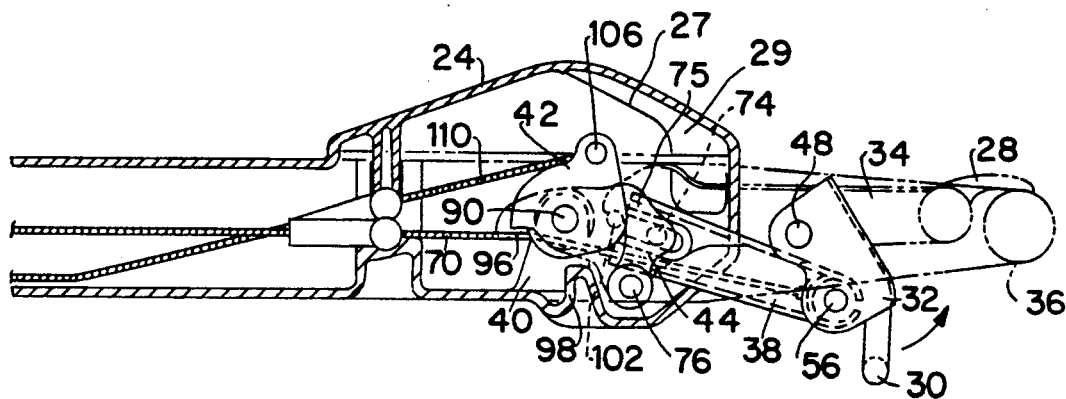
Figure 5:
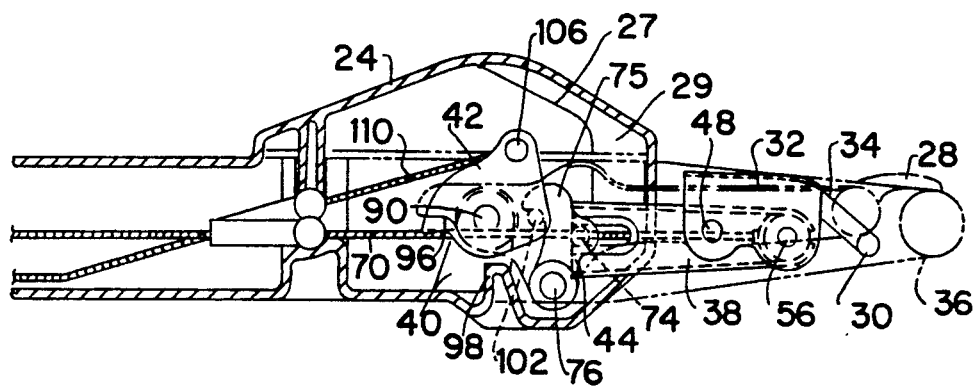

Next as shown in FIG. 4, the blade control lever 34 is lowered by rotating the blade lever crossbar 28 clockwise (CW) while the drive lever 32 is in the same "down" position as shown in FIG. 3. This action causes the eccentric plate 42 pivoted about the axis of the pivot bolt 90 to rotate clockwise (CW) due to the hook 75 engaging the pin 102. This rotation causes the blade clutch cable 110 to tighten and engage the blade drive clutch, not shown. Further as shown in FIG. 4, while the wheel drive clutch cable 70 is pulled down and slightly tightened, it is not enough to activate the wheel drive clutch for driving the wheels 18.

To thereafter activate at least one of the wheels 18 and thus make a transition into a mode where both the blade 12 and wheels 18 are driven simultaneously, one simply needs to rotate the crossbar member 30 of the wheel drive lever 32 upward so that the lever 32 rotates counter-clockwise (CCW) about the pivot 48. This causes the wheel drive cable 70 running through the body of the clutch rod 38 to tighten and thus activate the wheels 18. Thus to activate both the cutting blade and wheel drive, the operator would follow the sequence shown in FIGS. 2 through 5.

A subsequent release of the drive wheel crossbar 30 causes the tension in the drive clutch cable 70 to b removed whereupon power applied to the wheels 18 is removed. Raising of the blade control crossbar 28 following this causes a slackening in the blade clutch cable 110, causing the cutting blade 12 to also stop its rotation.

Figure 6:
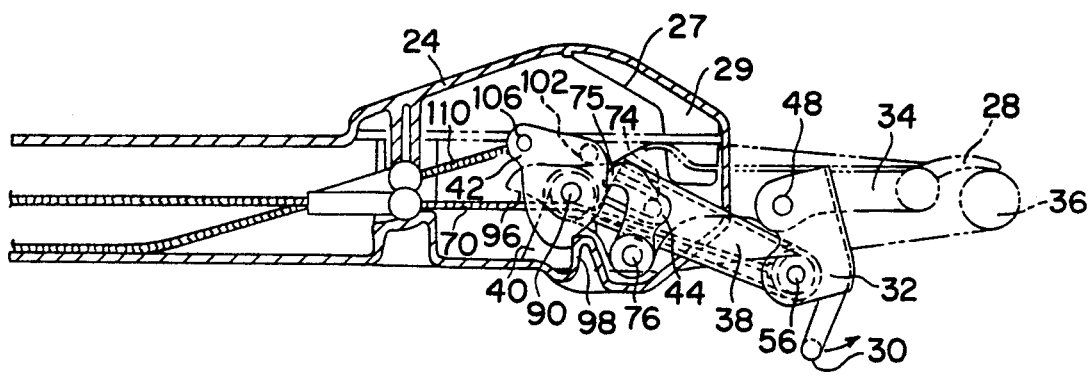

Now if it is desired to activate the wheel drive only, without any cutting blade rotation, the operator would pull down the blade drive lever 34 as shown in FIG. 6 first without any movement of the wheel drive lever 32. Since the neutral position as shown in FIG. 2 has caused the hook portion 75 of the member 44 to disengage the pin 102 of the eccentric plate 42, a pull down or clockwise (CW) rotation of the blade control lever 34 has no effect on the eccentric plate 42 to which the blade clutch cable 110 is connected. It is noted that the downward rotation of the drive clutch rod 38 in and of itself is not sufficient to tighten the drive clutch cable 70. However, as shown in FIG. 7, a subsequent upward pull on the drive lever crossbar 30 causes the wheel drive lever 32 to rotate counter-clockwise (CCW) about the pivot 48 which in turn causes the drive clutch rod 38 to retract rearwardly so as to sufficiently tighten the drive cable 70 while leaving the blade clutch cable 110 slack, thus permitting the operator to propel the carriage 10 from one location to another without the cutting blade 12 (FIG. 1) being activated.

It should be noted that the mechanism including guide 85 of the clutch rod 38 and the curved inner edge 27 of the inner face 29 of the housing 24 forces the crossbar 30 to move forward, as shown by reference numeral 31 in FIG. 2, when lowering the blade lever crossbar 28 to avoid the pinching of fingers between the rear crossbar member 36 of the handle assembly 14 shown in FIG. 1 and the crossbar 00 due to the fact that the angle between the blade lever crossbar 28 and the drive lever crossbar 30 increases as the two are moved downwardly.

Thus what has been shown and described is an improved apparatus for selectively actuating a wheel drive clutch and/or blade drive clutch in any of three separate operational modes in a simple, yet efficient mechanical configuration which eliminates the need for a separate operational lock or safety lever since it is already built in the overall structure.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the appended claims are herein meant to be included.

I claim:

1. A control lever assembly located on a self-propelled machine including a prime mover, at least one wheel for receiving power from said prime mover, an implement drivable by said prime mover for performing an operation on a surface traveled over by the self-propelled machine, a first clutch operatively coupled between the prime mover and said wheel, and a second clutch operably coupled between said prime mover and said implement, said control lever assembly comprising:
   lever assembly support means;
   a first lever member movable at an outer end for selectively activating and deactivating said first clutch;
   a second lever member movable at an outer end for selectively activating and deactivating said second clutch;
   said first lever member being pivotally mounted on an upper intermediate portion of said second lever member and said second lever member having an inner end pivotally mounted on said lever assembly support means;
   a first link member having a hook portion at one end, a first pin extending outwardly from an intermediate body portion thereof and being pivotally mounted on an inner intermediate portion of said second lever member;
   a second link member pivotally connected at one end to an inner region of said first lever member and having pin actuator means at an opposite end thereof for engagement with said first pin of the first link member;
   a third link member pivotally mounted on said lever assembly support means adjacent said second lever member and having a second pin extending outwardly from an intermediate body portion thereof and being engageable with said hook portion when said first link member is pivoted by said pin actuator means of said second link;
   first means for coupling the outer end portion of said first lever member to said first clutch; and
   second means for coupling a body portion of said third link member to said second clutch;
   wherein selective activation of said first and second lever members in a predetermined sequence of a plurality of sequences activates a selected one or both of said clutches for only driving said at least one wheel during a first operational mode, for only driving said implement during a second operational mode and for simultaneously driving both said wheel and said implement during a third operational mode.

2. A control lever assembly in accordance with claim 1 wherein said implement comprises a cutting element.

3. A control lever assembly in accordance with claim 1 wherein said first link member comprises a spring-biased hook type member, said second link member comprises an elongated clutch rod and said third link member comprises an off centered rotatable plate.

4. A control lever assembly in accordance with claim 3 wherein said first and second means for coupling respectively comprise a wheel drive clutch cable and an implement drive clutch cable.

5. A control lever assembly in accordance with claim 4 wherein said pin actuator means of said clutch rod comprises an elongated U-shaped slot extending along the length dimension of said clutch rod and having an open end for engaging said first pin.

6. A control lever assembly in accordance with claim 5 wherein said elongated clutch rod comprises a substantially hollow member for receiving said drive clutch cable therethrough for coupling one end of said drive clutch cable to said outer end portion of said first lever member.

7. A control lever assembly in accordance with claim 3 and additionally including means for constraining the motion of said clutch rod member upon actuation of said first lever member.

8. A control lever assembly in accordance with claim 3 wherein said first lever member comprise a three sided structure having an open side portion for receiving therein said one end of said elongated clutch rod.

9. A control lever assembly in accordance with claim 3 wherein said eccentric plate comprises a generally flat plate including a mounting hole at one end portion for being pivotally mounted on said lever assembly support means and means at the opposite end portion for coupling to one end of said implement drive clutch cable.

10. A control lever assembly in accordance with claim 1 wherein said lever assembly support means comprises a generally flat plate extending upwardly in relation to said second lever member.

11. A control lever assembly in accordance with claim 10 and additionally including means for inhibiting rotation of said second lever member and said third link member in a predetermined direction during deactivation of said clutches.

12. A control lever assembly in accordance with claim 11 and additionally including a control lever housing including a rotational stop element in a lower section thereof for said second lever member and said third link member.

13. A control lever assembly located on a self-propelled lawn mower including a prime mover, at least one wheel for receiving power from said prime mover, a mowing blade drivable by said prime mover, a first clutch operatively coupled between the prime mover and said wheel, and a second clutch operably coupled between said prime mover and said blade, said control lever assembly comprising:

lever assembly support means;
a first lever member movable at an outer end for selectively activating and deactivating said first clutch;
a second lever member movable at an outer end for selectively activating and deactivating said second clutch;
said first lever member being pivotally mounted on an upper intermediate portion of said second lever member and said second lever member having an opposite end pivotally mounted on said lever assembly support means;
a hook type member having a hook portion at one end, a first pin extending outwardly from an intermediate body portion thereof and being pivotally mounted on a lower inner intermediate portion of said second lever member;
an elongated clutch rod member pivotally connected at one end to an opposite end of said first lever member and having pin actuator means at an opposite end thereof for engagement with said first pin of said hook type member;
an eccentric plate member pivotally mounted on said lever assembly support means adjacent said second lever member and having a second pin extending outwardly from an intermediate body portion thereof and being engageable with said hook portion when said hook type member is pivoted by said pin actuator means of said clutch rod;
first means for coupling the outer end portion of said first lever member to said first clutch; and
second means for coupling a body portion of said eccentric plate member to said second clutch;
whereby selective activation of said first and second lever members in a predetermined sequence of a plurality of sequences activates a selected one or both of said clutches for only driving said at least one wheel in a first operational mode, for only driving said mowing blade in a second operational mode and for simultaneously driving both said wheel and said mowing blade in a third operational mode.

14. A control lever assembly in accordance with claim 13 wherein said first and second means for coupling respectively comprise a wheel drive clutch cable and a blade drive clutch cable.

15. A control lever assembly in accordance with claim 14 wherein said pin actuator means of said clutch rod comprises an elongated U-shaped slot extending along the length dimension of said clutch rod and having an open end for engaging said first pin of said hook type member.

16. A control lever assembly in accordance with claim 15 wherein said elongated clutch rod comprises a substantially hollow member for receiving said drive clutch cable therethrough for coupling one end of said drive clutch cable to said opposite and portion of said first lever member.

17. A control lever assembly in accordance with claim 16 wherein said first lever member comprises a three sided structure having an open side portion for receiving therein said one end of said elongated clutch rod.

18. A control lever assembly in accordance with claim 13 wherein said eccentric plate comprises a generally flat plate including a mounting hole at one end portion for being pivotally mounted on said lever assembly support means and means at the opposite end portion for coupling to one end of said mowing blade drive clutch cable.

19. A control lever assembly in accordance with claim 13 wherein said lever assembly support means comprises a generally flat plate extending upwardly in relation to said second lever member.

20. A control lever assembly in accordance with claim 13 and additionally including means for inhibiting rotation of said second lever member and said eccentric plate member in a predetermined direction during deactivation of said clutches for removing power from said prime mover being applied to said wheel and said blade.

21. A control lever assembly in accordance with claim 20 and additionally including a control lever housing include a rotational stop element in a lower section thereof for abutting said inhibiting means of said second lever member and said eccentric plate member.

22. A control lever assembly in accordance with claim 13 and additionally including means for constraining the motion of said clutch rod member upon actuation of said first lever member.

23. A control lever assembly in accordance with claim 13 wherein said first lever member includes actuation means, said clutch rod member includes cam follower means at said opposite end thereof, and cam means located adjacent said clutch rod member, for constraining the motion of said clutch rod member and thus impart a predetermined path of travel of said actuation means upon being moved downward.

24. A control lever assembly in accordance with claim 23 wherein said cam follower means comprises a guide pin and wherein said cam means comprises a curved edge located on an inner face of a control lever housing located on a handle assembly.

25. A control lever assembly in accordance with claim 24 wherein said inner face is located adjacent said clutch, rod member.

* * * * *